United States Patent [19]

Schiethart

[11] 4,196,366
[45] Apr. 1, 1980

[54] SYNCHRONOUS MOTOR

[75] Inventor: Lodewijk Schiethart, Dordrecht, Netherlands

[73] Assignee: Heemaf B.V., Hengelo, Netherlands

[21] Appl. No.: 885,008

[22] Filed: Mar. 9, 1978

[51] Int. Cl.² ............................................. H02K 19/05
[52] U.S. Cl. .................................... 310/162; 310/163; 310/114
[58] Field of Search ............................... 310/162–165, 310/112, 114, 126, 261, 172, 156, 211, 182, 183, 168

[56] References Cited

U.S. PATENT DOCUMENTS

| | | | |
|---|---|---|---|
| 2,338,525 | 1/1944 | Mason | 310/162 |
| 2,435,911 | 2/1948 | Vanderwoule | 310/163 |
| 2,442,626 | 6/1948 | Tolson et al. | 310/163 |
| 2,543,639 | 2/1951 | Merrill | 310/211 |
| 2,643,350 | 6/1953 | Merrill | 310/211 X |
| 2,927,229 | 3/1960 | Merrill | 310/162 |
| 3,157,809 | 11/1964 | Bekey | 310/162 X |
| 3,521,098 | 7/1970 | Jesse | 310/163 |
| 3,614,496 | 10/1971 | Schiethart | 310/162 |
| 3,732,448 | 5/1973 | Schiethart | 310/162 |
| 3,743,873 | 7/1973 | DeJong | 310/114 X |
| 3,835,572 | 10/1974 | DeKugerp | 310/114 X |
| 3,848,146 | 11/1974 | Tourtellot et al. | 310/163 |
| 4,082,973 | 4/1978 | Schiethart | 310/183 X |

Primary Examiner—Donovan F. Duggan
Attorney, Agent, or Firm—John P. Snyder

[57] ABSTRACT

An electric synchronous motor comprising a rotor with a cage winding consisting of a solid shaft and rotor laminar packets holding the cage rods, sequential poles being located in axially spaced planes, a stator with a field winding and a direct-current energizing winding located between said planes on the rotor having as characterizing feature that the lamination packets form closed rings and the shaft of the rotor has local recesses to form holes. In this way a higher starting torque can be developed than in a motor of the same size, since the cage rods are embedded in iron also in the interpolar space.

11 Claims, 5 Drawing Figures

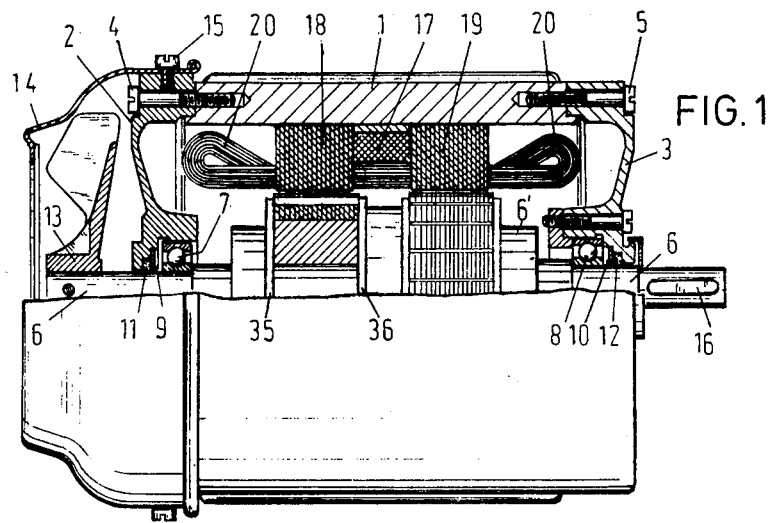
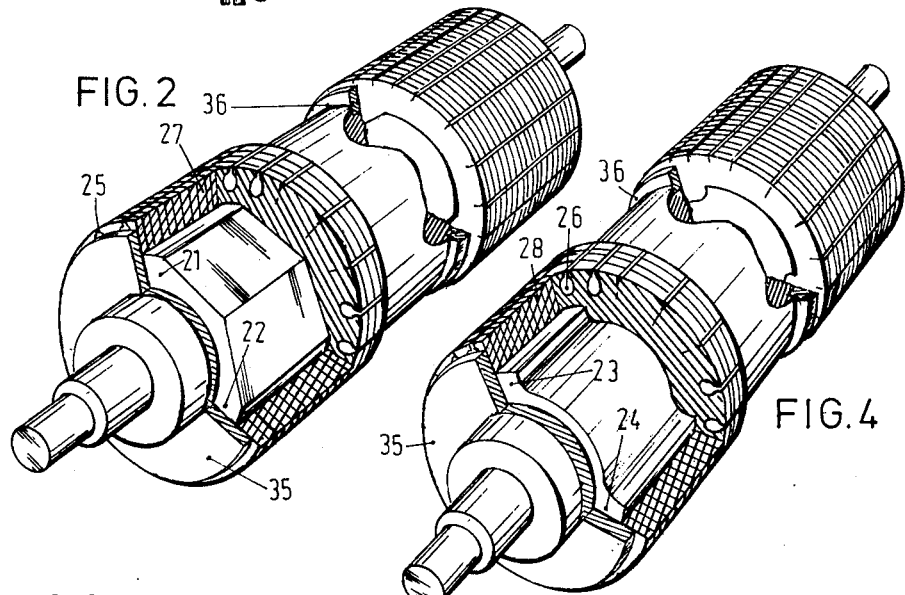
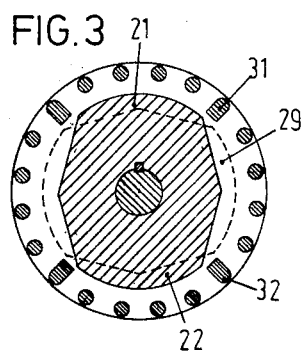
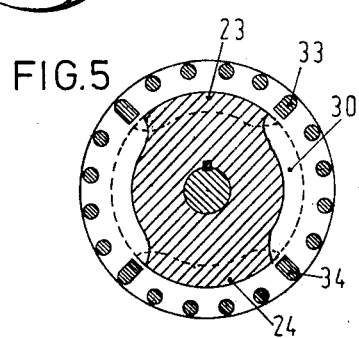

SYNCHRONOUS MOTOR

The invention relates to an electric synchronous motor comprising a rotor with a cage winding consisting of a solid shaft and rotor laminar packets holding the cage rods, sequential poles being located in axially spaced planes, a stator with a field winding and a direct-current energizing winding located between said planes on the rotor. Such a motor is known from U.S. Pat. No. 3,732,448, corresponding to Dutch patent application No. 70.05797.

For certain uses, for example, for speeds of about 12,000 rev/min in the synchronous state and a high load, it may be difficult to attain the synchronous state. In fact the power produced by the motor is sufficient for maintaining the synchronous state, once reached, but the load or the inertia of the driven member may hinder the start to an extent such that the synchronous state cannot be attained. Attempts have been made to solve this problem by switching on in steps in order to attain the synchronous state in phases. However, this is not always possible and requires additional means for achieving a stepwise start. Conditions involving such problems are found, for example, in the synthetic fibre industry, where such motors are employed for driving heated discs. A further solution of the problem resides in the choice of a motor of higher power than is required for maintaining the synchronous state. As a matter of course, this brings about additional costs.

A further possibility consists in that the motor is started with a lower load than the load in operation, whilst after having reached the synchronous state the load is increased. This requires additional steps.

The invention has for its object to eliminate said disadvantages. This is achieved by shaping the laminar packets in the form of closed rings and by providing local recesses in the shaft of the rotor to form poles. It is thus ensured that since the cage rods are embedded in iron also in the interpolar space a higher starting torque can be developed than by a motor of the same size of the prior art. Hitherto the poles were formed by the rotor packets interrupted in the interpolar space so that the cage rods were not surrounded by iron in this interpolar space. According to the invention the poles are formed on the solid part of the rotor shaft. In fact, the axial magnetic conductability is reduced by the smaller sectional area of the shaft, but this solely results in a lower power during synchronous operation, which is not an objection.

In order to ensure that the magnetic flux leaves the rotor in a radial direction, the radial cross-section of the rings at the interface between the polar and interpolar spaces is reduced. The magnetic conductability in a tangential direction is thus reduced so that the magnetic flux is blocked in said direction. The reduction of the radial cross-section can be obtained by providing local recesses in said rings.

The invention will be described more fully with reference to the drawing.

In the drawing:

FIG. 1 is a longitudinal sectional view of a 4-pole motor in accordance with the invention, FIG. 2 is a perspective view of the rotor of the motor in accordance with the invention, FIG. 3 is a sectional view taken on the line III—III in FIG. 2, FIG. 4 is a perspective view of a variant of the rotor in accordance with the invention and FIG. 5 is a sectional view taken on the line V—V in FIG. 4.

The stationary part of the stator of the motor comprises a substantially cylindrical housing 1, on each side of which shields 2 and 3 are arranged. The shields 2,3 are secured by means of bolts 4, 5 to the housing 1 and have bores of passing the rotor shaft. Ball bearings 7,8 hold the shaft in the shields 2 and 3 respectively. The ball bearings 7,8 are closed by rings 9 and 10 respectively. Between the ring 9 and the shield 2 is arranged a felt ring 11 and between the ring 10 and the shield 3 there is arranged a felt ring 12. The left-hand part of the shaft, as seen in the drawing, has a blade wheel 13 operating as a blower. The blade wheel 13 is screened by a plate 14, which is secured by bolts 15 to the housing 1. The right-hand part of the shaft has a key way 16. The direct-current winding 17 energizes the motor. On either side of a spacer ring surrounding the winding 17 are arranged laminated stator cores 18 and 19 provided with a mono- or multiphase winding 20. The winding 20 comprises coils or groups of coils, the circumferential dimensions of which substantially correspond to the pole pitch for different polarities. With the aid of the winding 20 there is produced an alternating or rotating field.

The two end portions of the shaft 6 are made from non-magnetisable material, whereas the central portion 6' of larger diameter is made from magnetisable material. On the central portion poles, for example, 21, 22 or 23, 24 are formed in two axially spaced planes. Moreover cages are provided on the rotor in the axially spaced planes. In the cages with the rods, for example, 25 in FIG. 2 and 26 in FIG. 4, are arranged the annular rotor lamination packets, for example, 27 and 28. Therefore, even in the interpolar space 29,30 the rods are set in iron owing to the annular shape of the rotor packets. In order to block the magnetic flux in a tangential direction at the interface between the polar and interpolar spaces, deep, uninterrupted grooves, for example, 31,32 and 33, 34 are provided locally. The poles are formed in the shaft by local reduction of the diameter thereof, for example, by chamfering or by another mode of machining so that a rounded-off shape is obtained (FIG. 5).

In FIGS. 3 and 5 the broken lines indicate the poles in the axially shifted plane. The cages are axially bounded by rings, for example, 35 and 36.

What I claim is:

1. An electric synchronous motor comprising a rotor with cage winding consisting of a solid shaft and rotor lamination packets holding the cage rods, sequential rotor poles being located in axially spaced planes, a stator with a field winding and a direct-current energizing winding surrounding the rotor between said planes, characterized in that the lamination packets form closed rings and the shaft of the rotor has local recesses to form poles.

2. A synchronous motor as claimed in claim 1 characterized in that the diameter of the rotor shaft is locally reduced.

3. A synchronous motor as claimed in claim 2 characterized in that the shaft is locally chambered.

4. A synchronous motor as claimed in claim 3 characterized in that the shaft is rounded off at the transitional area to a smaller diameter.

5. A synchronous motor as claimed in claim 4 characterized in that the radial sectional area of the rings at the interface between the polar and interpolar spaces is reduced.

6. A synchronous motor as claimed in claim 3 characterized in that the radial sectional area of the rings at the interface between the polar and interpolar spaces is reduced.

7. A synchronous motor as claimed in claim 2 characterized in that the radial sectional area of the rings at the interface between the polar and interpolar spaces is reduced.

8. A synchronous motor as claimed in claim 1 characterized in that the radial sectional area of the rings at the interface between the polar and interpolar spaces is reduced.

9. A synchronous motor as claimed in claim 8 characterized in that the rings have a recess at the interface between the polar and interpolar spaces.

10. An electric synchronous motor comprising, in combination:
  a housing having opposite end portions and a rotor having opposite end portions rotatably supported by the opposite end portions of the housing;
  a stator assembly disposed within and supported by said housing, said stator assembly comprising a pair of axially spaced, annular stator cores, d.c. energizing winding means disposed within said cores, and a.c. winding means bridging said cores for producing a rotating magnetic field;
  said rotor having an enlarged intermediate section of magnetizable material and presenting a first portion surrounded by said d.c. winding and further portions on either side of said first portion surrounded respectively by said stator cores, said first portion being of cylindrical form and said further portions having local recesses forming poles, there being two diametrically opposed poles on each further portion of the rotor and the poles of one further portion being angularly offset from the poles of the other further portion;
  first and second lamination packets respectively engaged upon and surrounding said further portions of the rotor, each packet being of cylindrical outer surface form and having an inner surface conforming to the shape of its respective further portion of the rotor whereby each lamination is of closed ring form; and
  a series of circumferentially spaced cage rods embedded in each packet and each being substantially coextensive in length with its associated packet.

11. An electric synchronous motor as defined in claim 10 wherein said further portions of the rotor are of reduced diameter with respect to said first portion thereof.

* * * * *

UNITED STATES PATENT AND TRADEMARK OFFICE
CERTIFICATE OF CORRECTION

PATENT NO. : 4,196,366
DATED : April 1, 1980
INVENTOR(S) : Lodewijk Schiethart

It is certified that error appears in the above-identified patent and that said Letters Patent are hereby corrected as shown below:

On the title page the following should be added:

--[30] Foreign application priority data

Mar. 17, 1977    Netherlands    77 02925 --.

Signed and Sealed this

Seventeenth Day of June 1980

[SEAL]

Attest:

SIDNEY A. DIAMOND

Attesting Officer    Commissioner of Patents and Trademarks